United States Patent [19]

Domburg

[11] Patent Number: 5,689,099
[45] Date of Patent: Nov. 18, 1997

[54] SPEED/DISTANCE MEASURING ASSEMBLY FOR RUNNER

[76] Inventor: Nicolaas Domburg, Saffraanplein 24, NL-2215 WC, Voorhout, Netherlands

[21] Appl. No.: 676,281

[22] PCT Filed: Jan. 18, 1995

[86] PCT No.: PCT/NL95/00026

§ 371 Date: Sep. 12, 1996

§ 102(e) Date: Sep. 12, 1996

[87] PCT Pub. No.: WO95/19548

PCT Pub. Date: Jul. 20, 1995

[30] Foreign Application Priority Data

Jan. 18, 1994 [NL] Netherlands .................. 9400085

[51] Int. Cl.$^6$ .................. G01C 22/00; G08B 23/00; A63B 71/00
[52] U.S. Cl. .................. 235/105; 364/410; 364/561; 364/565; 340/323 R; 377/24.2; 482/74; D10/70
[58] Field of Search .................. 364/410, 413.27, 364/560, 561, 565; 367/99; 235/105, 106; 340/323 R; 377/24, 24.2; 482/74; D10/70; 73/488, 489, 490

[56] References Cited

U.S. PATENT DOCUMENTS

| | | | |
|---|---|---|---|
| 4,192,000 | 3/1980 | Lipsey | 304/415 |
| 4,371,945 | 2/1983 | Karr et al. | 304/561 |
| 4,387,437 | 6/1983 | Lowrey et al. | 304/561 |
| 4,578,769 | 3/1986 | Frederick | 364/563 |
| 4,703,445 | 10/1987 | Dassler | 364/561 |
| 4,736,312 | 4/1988 | Dassler et al. | 364/561 |
| 4,763,287 | 8/1988 | Gerhaeuser et al. | 304/561 |
| 4,821,218 | 4/1989 | Potsch | 364/566 |
| 4,943,050 | 7/1990 | Smith | 272/70 |

FOREIGN PATENT DOCUMENTS

| | | |
|---|---|---|
| 0 119 009 | 9/1984 | European Pat. Off. |
| 0 152 057 | 8/1985 | European Pat. Off. |
| 0 192 172 | 8/1986 | European Pat. Off. |
| 0 253 984 | 1/1988 | European Pat. Off. |
| 3 514 130 | 11/1985 | Germany |
| WO 86/01607 | 3/1986 | WIPO |

*Primary Examiner*—Adolf Berhane
*Attorney, Agent, or Firm*—Young & Thompson

[57] ABSTRACT

Method and assembly for measuring the speed of or distance covered by a runner. According to the invention, the angular displacement of the foot is measured, and the distance of the trunk from a reference, such as the foot or the ground, is determined. On the basis of these data it is possible to calculate the speed or distance.

11 Claims, 2 Drawing Sheets

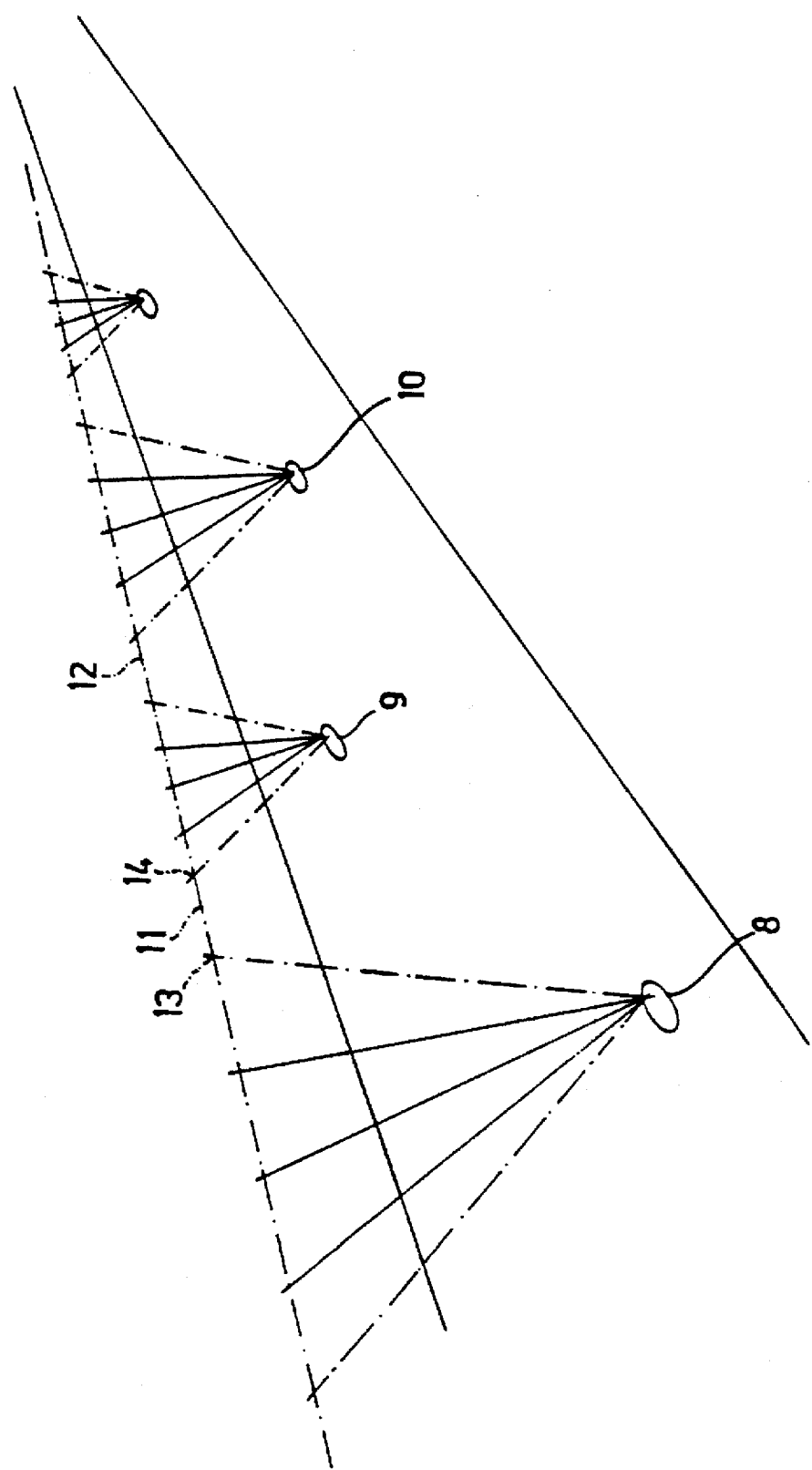

SPEED/DISTANCE MEASURING ASSEMBLY FOR RUNNER

The invention relates to a speed/distance meter assembly for a runner/ jogger, walker.

The need for such a assembly, also called a pedometer, has already existed for a long time. For example, such a movement meter is described in German Offenlegungsschrift 3,514,130, in the case of which the number of steps is recorded, and the distance covered is determined from that number. How this is carried out is not clear, but it is assumed that the distance covered with each step is probably constant. This means that this distance needs to be determined in some way beforehand.

It is not simple to determine the distance from the number of steps taken. For the length of the steps is not necessarily constant. Besides, it is possible that for part of the movement the runner is not in contact with the ground. Such complicating factors make the device described in German Offenlegungsschrift 3,514,130 completely pointless for a habitual runner.

The object of the present invention is to provide a speed/distance meter assembly which does not have these disadvantages.

This object is achieved in the case of an assembly of the type described above in that said assembly comprises angular speed-measuring means for determining the speed of the angle change of the foot relative to a reference, distance-measuring means for constantly measuring the current distance of the trunk from a further reference, and processing means which on the basis of the angular speed and the current distance determine the distance travelled and/or the speed achieved. The pivot movement which the leg makes about the contact point of the foot with the ground during running is the basis of the present invention. This angle change can be established by determining the angle change of a line drawn between a certain point on the foot and the trunk. The vertical is preferably used as the reference for the angle change. For the position of the angle relative to the horizontal is important for deriving the horizontal displacement from the angle change.

The further reference, relative to which the distance is measured, can be, for example, the ground. However, it is preferably the foot, since means can easily be fitted there for establishing the distance accurately.

It has been found that, apart from the angular displacement of the leg relative to the trunk, not to mention the leg relative to the vertical or horizontal, the distance between trunk and foot or trunk and ground or any other reference is important for determining the speed.

In principle, it is possible to measure the movement of only one leg relative to the trunk. However, a more accurate result is obtained if the angular displacement of both legs relative to the trunk and their distance from the ground are measured. Of course, it is also possible to determine the angle between the legs. As already indicated above, "legs" should be understood as the imaginary line drawn through the pivot point of the thigh in the pelvis, or a point slightly higher up, and a point on the runner's foot.

As soon as the runner/walker is moving faster, there will come a certain point when neither of his legs is any longer in contact with the ground. The runner is making a jumping movement. It is necessary to take special measures to make a correction for such a span where there is no contact with the ground. This can be achieved according to a special embodiment of the invention through the fitting of contact means which determine the contact of the body with the ground, and which are connected to the processing means. All contact means known in the prior art can be used for this purpose. Moreover, the speed taken for the movement of the body when there is no contact with the ground is preferably the speed which corresponds to the last speed measured in the abovementioned way.

The invention also relates to a shoe provided with the appropriate sensors for determining the distance from the trunk and for determining the angle relative to the trunk. All means known in the prior art can be used. The processing assembly will preferably be situated near the runner's middle and will in some way transmit beams to the sensor on the foot, which are processed in some way and reflected back.

The invention also relates to a method for measuring a speed of a runner or the distance covered by a runner, comprising:

measuring the distance between a part of the body of the runner which moves essentially uniformly during forward movement and a reference, and measuring the angular speed of an imaginary part formed by the straight line drawn through the contact point of the runner's foot with the ground from the pivot point of that leg of the runner in his pelvis.

As already indicated above, this distance measurement is preferably carried out by measuring the distance between the trunk and the foot, more particularly near the contact point of the foot and the ground. However, it is also possible to measure the distance between trunk and ground directly.

The invention will be explained in greater detail below with reference to an exemplary embodiment shown in the drawing, in which:

FIG. 3 shows diagrammatically the movement sequence in a running/walking movement during which there is not always contact with the ground.

Figure 1:
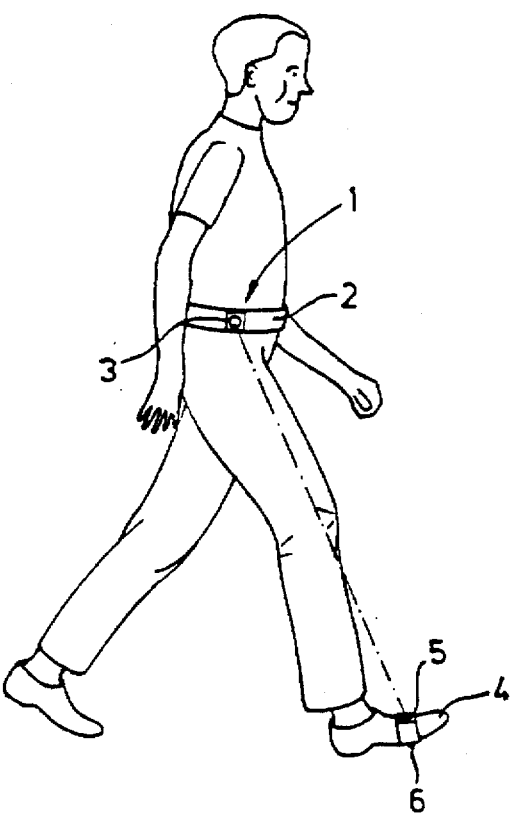
FIG. 1 shows a runner provided with the assembly according to the invention.
Figure 2:
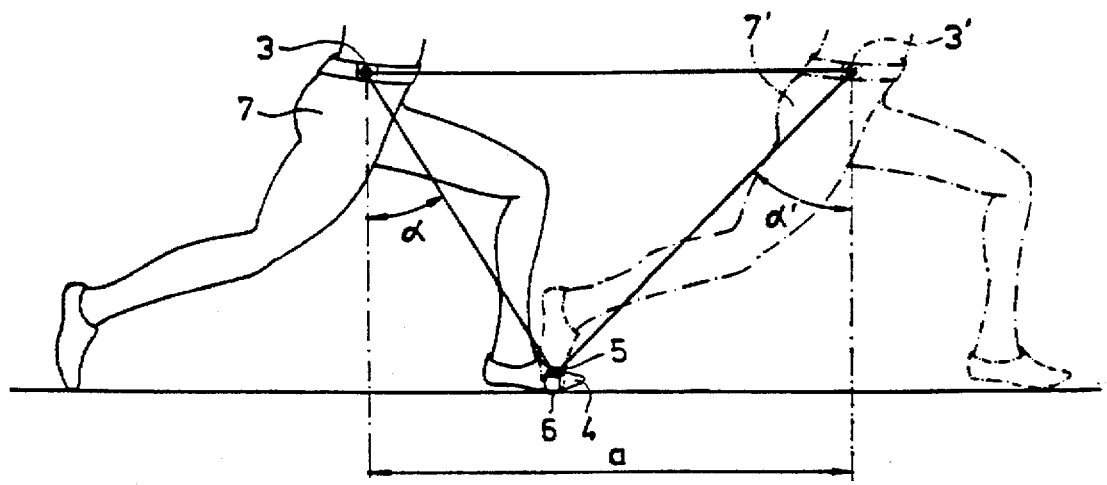
FIG. 2 shows the lower part of the body of the runner in different positions.

FIG. 1 shows a runner who is indicated in his entirety by 1. He is provided around his middle with a band or belt 2 on which a central transmitting/processing assembly 3 is fitted. The shoe 4 of the runner is provided with a transmitting/processing assembly 5. In addition, a contact sensor 6 is fitted on the underside of the shoe. The way in which the device works will be illustrated with reference to FIG. 2. During movement of the runner the distance between the pivot point of the thigh in the pelvis, which is indicated by 7 and approximately where the transmitting/processing assembly 3 is situated, and the central transmitting/processing assembly 5 on the foot is determined. In addition, the angle of the line 3–5 indicated in the drawing by α is measured relative to the vertical. The runner then moves to the right, as shown in the right-hand part of FIG. 2. In the course of this a distance a is covered. This distance can be determined by determining the distance 3'5 and determining the angle α' shown in the right-hand part of FIG. 2. In this way the triangle shown by solid lines is established. After the distance is known, it is easy to determine the speed, taking into account the time which has elapsed. The running movement of a person can be established unequivocally in this way. These data can be read out, printed out and/or stored and read out later.

As can be seen from FIG. 3, it is, however, possible that there is no contact with the ground for a certain period. The footprints of the runner are shown by 8, 9 and 10. In the spans indicated by 11 and 12 there is no contact with the ground. According to the invention, the device is designed in such a way that at the moment when contact is lost (indicated by 13 for interval 11) and up to the moment when contact is re-established (which moment is indicated by 14 for interval 11) the last known speed is assumed be constant for the span 13–14. Whether or not contact is made with the ground is detected by means of contact sensor 6.

The positioning of the transmitting/processing assembly 5 can in principle be at any point of the foot, although in special cases a correction will be necessary in the central transmitting/processing assembly. However, it is preferably placed in the front part of the shoe, with the result that the distance from the contact sensor 6 can also remain relatively short.

Fitting the processing assembly at the front part of the shoe has the further advantage that the measurement is accurate because the front part of the shoe is in contact with the ground for longer than the heel. In fact, this part of the foot executes a rolling movement. It is also possible to fit both the contact sensor and assembly 3 near the heel. Moreover, it is conceivable to design the contact sensor as a shock sensor, so that the fitting position on the foot is not critical. Depending on the possibilities of the two transmitting/processing assemblys, the time interval during which measurement is carried out can be selected longer or shorter. The shorter the interval, the more accurate the measurement. The result of the running can then be stored in the transmitting/processing assembly 3, or it can be read out directly in some way by means of a display.

This and further variants of embodiment are within the scope of the appended claims.

I claim:

1. Speed/distance meter assembly for a runner/walker, comprising angular speed-measuring means for determining the speed of the angle change in the straight line drawn between the foot of the runner and a point near the pivot point of the leg in question in the pelvis relative to a reference, distance-measuring means for constantly measuring the current distance of the trunk from a further reference, and processing means which on the basis of the angular speed and the current distance determine the distance travelled and/or the speed achieved.

2. Speed/distance meter assembly according to claim 1, in which said reference comprises the vertical.

3. Speed/distance meter assembly according to claim 1, in which said further reference comprises a foot.

4. Speed/distance meter assembly according to claim 1, in which the angular speed-measuring means for determining the speed of the angle change of the leg relative to the trunk comprise sensor means fitted near the pivot point of the thigh with the trunk, and sensor means interacting therewith and fitted on the runner's foot.

5. Speed/distance meter assembly according to claim 1, in which contact means are provided which determine the contact of the body with the ground, and which are connected to the processing means.

6. Speed/distance meter assembly according to claim 1, arranged in such a way that when there is no contact between the foot and the ground the speed of the body is taken as essentially corresponding to the speed during the last moment of contact with the ground.

7. Speed/distance meter assembly according to claim 1, in which an angular speed-measuring means and a distance-measuring means are fitted for each leg.

8. Speed/distance meter assembly according to claim 1, comprising a shoe provided with a sensor for determining the distance from the trunk.

9. Speed/distance meter assembly according to claim 8, in which said sensor is fitted in the toe part of the shoe.

10. Method for measuring a speed of a runner or the distance covered by a runner, comprising:

measuring the distance between a part of the body of the runner which moves essentially uniformly during forward movement and a reference, and measuring the angular speed of an imaginary part formed by the straight line drawn through the contact point of the runner's foot with the ground from the pivot point of said leg of the runner in his pelvis.

11. Method according to claim 10, in which measuring the distance to the ground comprises measuring the distance to the contact point of the runner's foot with the ground.

* * * * *